US009083417B2

(12) United States Patent
Tang et al.

(10) Patent No.: US 9,083,417 B2
(45) Date of Patent: Jul. 14, 2015

(54) METHOD AND DEVICE FOR INTERFERENCE CANCELLATION

(75) Inventors: Zhixun Tang, Beijing (CN); Liang Zhuang, Beijing (CN)

(73) Assignee: ST-ERICSSON SEMICONDUCTOR (BEIJING) CO., LTD, Beijing (CN)

( * ) Notice: Subject to any disclaimer, the term of this patent is extended or adjusted under 35 U.S.C. 154(b) by 118 days.

(21) Appl. No.: 13/991,708

(22) PCT Filed: Dec. 2, 2011

(86) PCT No.: PCT/CN2011/083361
§ 371 (c)(1),
(2), (4) Date: Jul. 16, 2013

(87) PCT Pub. No.: WO2012/075910
PCT Pub. Date: Jun. 14, 2012

(65) Prior Publication Data
US 2013/0287087 A1 Oct. 31, 2013

(30) Foreign Application Priority Data

Dec. 6, 2010 (CN) .......................... 2010 1 0582268

(51) Int. Cl.
*H03H 7/30* (2006.01)
*H04B 1/10* (2006.01)
*H04B 1/7105* (2011.01)
*H04B 1/7107* (2011.01)

(52) U.S. Cl.
CPC ............... *H04B 1/10* (2013.01); *H04B 1/7107* (2013.01); *H04B 1/71052* (2013.01); *H04B 2201/709736* (2013.01)

(58) Field of Classification Search
USPC ....................................................... 375/232
See application file for complete search history.

(56) References Cited

U.S. PATENT DOCUMENTS

| 8,098,723 B2 * | 1/2012 | Banna et al. | 375/232 |
| 2004/0196892 A1 * | 10/2004 | Reznik | 375/148 |
| 2005/0153663 A1 * | 7/2005 | Pan et al. | 455/78 |

FOREIGN PATENT DOCUMENTS

| CN | 1949683 A | 4/2007 |
| CN | 101128056 A | 2/2008 |
| CN | 102025392 A | 4/2011 |
| WO | 2009128771 A1 | 10/2009 |

OTHER PUBLICATIONS

International Search Report issued in corresponding International application No. PCT/CN2011/083361, date of mailing Mar. 15, 2012.

* cited by examiner

*Primary Examiner* — Lihong Yu
(74) *Attorney, Agent, or Firm* — Patent Portfolio Builders PLLC

(57) ABSTRACT

An interference cancellation method performed by a receiver includes: determining a strong interference code channel among all code channels that carry a received signal, and determining a signal that corresponds to the strong interference code channel to be a strong interference signal, wherein the received signal has been matched filtered. The method further includes obtaining a reconstructed strong interference signal based on the determined strong interference signal and using a system matrix, performing the interference cancellation for the received signal using the reconstructed strong interference signal, to obtain the signal without interference. The strong interference signal can be reconstructed using the system matrix, and the interference cancellation can be performed for the received signal using the reconstructed strong interference signal. The complexity of inverting the matrix is reduced and the performance is enhanced by reducing the order of the matrix, and thus increasing the efficiency of cancelling the interference.

9 Claims, 4 Drawing Sheets

METHOD AND DEVICE FOR INTERFERENCE CANCELLATION

BACKGROUND OF THE INVENTION

1. Field of the Invention

The present invention relates to a communication field, and more particularly to an interference cancellation method and apparatus.

2. Description of the Prior Art

In a DS-CDMA (Direct Sequence-Code Division Multiple Access) system, CDMA (Code Division Multiple Access) technologies may be mainly adopted. Due to the propagation time delays of different signals being different and the presence of scrambling codes, spreading code sets adopted by respective signals are not completely orthogonal. Such interference caused by a non-zero cross-correlation coefficient is usually called MAI (Multiple Access Interference).

In a CDMA system, a MF (Matched Filter) (matched filter theory being adopted by a traditional Rake receiver) or a MUD (Multi User Detector) is usually adopted to restore the data before spreading and scrambling. However, the traditional matched filter apparatus may not efficiently suppress the MAI, while the MUD apparatus may preferably eliminate the impact caused by the MAI.

In a TD-SCDMA (Time Division-Synchronous Code Division Multiple Access) system, the MUD apparatus may adopt a JD (joint Detector) apparatus, which is a kind of linear MUD apparatus. Due to the operation of system matrix inversion being required to be implemented, the dimension of the system matrix will increase as a SF (Spread Factor) adopted by the CDMA system is large, the length of the scrambling code is long or the number of the interference user is large, which results in that the complexity of the operation for the matrix inversion increases and the performance of the apparatus is reduced, and the efficiency of the process for cancelling the interference is low. Meanwhile, the existence of a large number of strong interference signals in the system may impact the output performance of the whole equalizer.

No effective resolution has yet been proposed for the problem of low efficiency of the process for cancelling the interference if the adopted SF is large, the length of the scrambling code is long or the number of the interference user is large in the related art. In addition, no effective resolution has yet been proposed for the problem of low system demodulation performance caused by the large number of strong interference signals.

SUMMARY OF THE INVENTION

For both the problem of low efficiency of the process for cancelling the interference if the adopted SF is large, the length of the scrambling code is long or the number of the interference user is large in the related art, and the problem of impact on the output performance of the whole equalizer due to the presence of a large number of strong interference signals in the system, the present invention proposes an interference cancellation method and apparatus for reducing the operation complexity of the matrix inversion and improving the performance of the apparatus.

The technical solutions of the present invention may be implemented as follows:

An interference cancellation method, which may comprise:

determining a strong interference code channel among all code channels that carry a received signal, and determining a signal that corresponds to the strong interference code channel to be a strong interference signal by a receiver, wherein the received signal is a signal that has been matched filtered;

obtaining a reconstructed strong interference signal based on the determined strong interference signal reconstructed from a system matrix by the receiver; and performing the interference cancellation for the received signal by utilizing the reconstructed strong interference signal, and obtaining the signal whose interference have been cancelled by the receiver.

Furthermore, after performing the interference cancellation for the received signal by utilizing the reconstructed strong interference signal, and obtaining the signal whose interference have been cancelled by the receiver, the method may further comprise:

setting a column that corresponds to a sequence number of the strong interference code channel in the system matrix into 0 and obtaining a clipped matrix by the receiver;

performing equalization operation for the signal whose interference have been cancelled by utilizing the clipped matrix by the receiver.

Here, the operation of determining a strong interference code channel among all code channels that carry a received signal by the receiver may comprise:

determining a power value of each code channel, comparing the power value with a power value of a code channel of a local user, and determining the code channel to be a strong interference code channel if a ratio of the power value and a power value of the code channel of the local user is larger than or equal to a predetermined value by the receiver.

Specifically, the power value $P^{(k)}$ of the k-th code channel may be determined by the following equation:

$$P^{(k)} = \sum_{i=1}^{X} |e_{mf,i}^{(k)}|^2$$

Here, $e_{mf,i}^{(k)}$ is the i-th symbol of the k-th code channel for the output of a matched filter, and X is the number of symbols of each code channel.

Specifically, the reconstructed strong interference signal may be determined by the following equation:

$$\hat{d}_{SI} = \overline{\text{diag}}(A^H A) e_{mf,SI}$$

Here, $e_{mf,SI}$ is the strong interference signal, A is the system matrix, $\overline{\text{diag}}(.)$ is a matrix generated by setting diagonal elements into 0, $$e_{mf,SI} = \left\{ \underbrace{\overbrace{0 \; \cdots \; 0}^{K_{vru}} \; \overbrace{0 \; \cdots \; 0}^{K_{vru}}}_{44*(K_{vru}-n)} \; \cdots \; e_{mf,1}^{(SI1)} \; \cdots \; e_{mf,44}^{(SI1)} \; \cdots \; e_{mf,1}^{(SIn)} \; \cdots \; e_{mf,44}^{(SIn)} \right\},$$

Kvru is the total number of the code channels, $e_{mf,j}^{(SIi)}$ is the j-th element in the code channel of the i-th strong interference signal, and n is the number of the strong interference code channels.

Specifically, the signal whose interference have been cancelled may be determined by the following equation:

$$\hat{d}_{MFIC} = (\text{diag}(A^H A))^{-1} e_{mf,PS} - (\text{diag}(A^H A))^{-1} \hat{d}_{SI}$$

Here, $(.)^{-1}$ is the matrix inversion, diag(.) is a matrix generated by setting non-diagonal elements into 0, $e_{mf,SI}$ is the strong interference signal, and $e_{mf,PS}$ is a signal generated by sequencing the powers of all code channels in an ascending sequence.

An interference cancellation apparatus, which may comprise:

an interference detection module, being configured for determining a strong interference code channel among all code channels that carry a received signal, and determining a signal that corresponds to the strong interference code channel to be a strong interference signal, wherein the received signal is a signal that has been matched filtered;

a reconstruction module, being configured for obtaining a reconstructed strong interference signal based on the determined strong interference signal reconstructed from a system matrix; and an interference cancellation module, being configured for performing the interference cancellation for the received signal by utilizing the reconstructed strong interference signal, and obtaining the signal whose interference have been cancelled.

Furthermore, the apparatus may further comprise:

an interference code channel determining module, being configured for determining a power value of each code channel, comparing the power value with a power value of a code channel of a local user, and determining the code channel to be a strong interference code channel if a ratio of the power value and the power value of the code channel of the local user is larger than or equal to a predetermined value.

Furthermore, the apparatus may further comprise:

a matrix clipping module, being configured for setting a column that corresponds to the sequence number of the strong interference code channel in the system matrix into 0 and obtaining a clipped matrix.

Furthermore, the apparatus may further comprise:

an equalization processing module, being configured for performing an equalization operation for the signals whose interference have been cancelled by utilizing the clipped matrix.

By means of the above technical solutions of the present invention, the strong interference signal may be reconstructed by utilizing the system matrix, and the interference cancellation may be performed for the received signal by utilizing the reconstructed strong interference signal. In addition, the complexity of the operation for the matrix inversion can be reduced and the performance of the apparatus can be improved by reducing the order of the matrix, and thus the efficiency of the process for cancelling the interference can be increased.

DETAILED DESCRIPTION OF THE PREFERRED EMBODIMENTS

According to the present invention, the position of the TD-SCDMA interference cancellation apparatus in the joint detecting may be after the matched filter and before the equalizer. Specifically, in the joint detecting, the strong interference signal may be detected from the output of the matched filter, and the interference signals of other users may be reconstructed. Then in the joint detecting, the interference cancellation may be performed for the output of the matched filter and the reconstructed interference signals.

In the following, the present invention will be described in details in connection with the figures.

Figure 1:
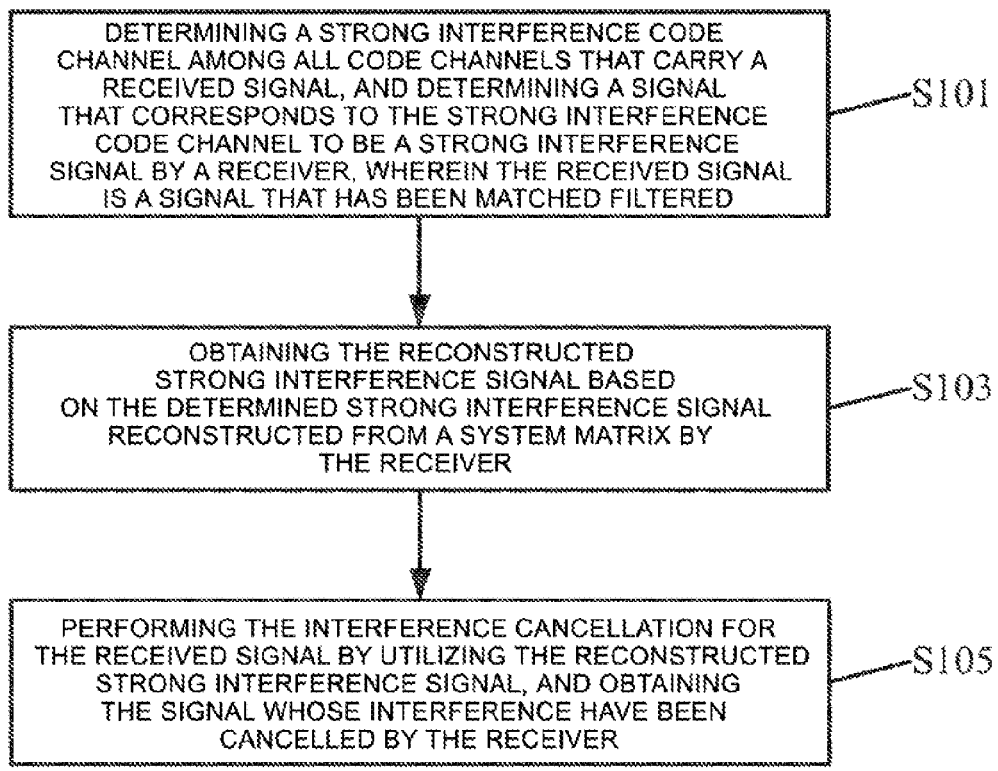
FIG. 1 is a flow chart illustrating an interference cancellation method according to an embodiment of the present invention.

FIG. 1 is a flow chart illustrating an interference cancellation method according to the embodiment of the present invention. As illustrated in FIG. 1, the method may comprise the following steps:

In step S101, a receiver may determine a strong interference code channel among all code channels that carry a received signal, and may determine a signal that corresponds to the strong interference code channel to be a strong interference signal, wherein the received signal may be a signal that have been matched filtered. Specifically, the receiver may determine a power value of each code channel, compare the power value with a power value of a code channel of a local user, and determine the code channel to be a strong interference code channel if a ratio of the power value and a power value of the code channel of the local user is larger than or equal to a predetermined value.

In step S103, the receiver may obtain the reconstructed strong interference signal based on the determined strong interference signal reconstructed from a system matrix.

In step S105, the receiver may perform the interference cancellation for the received signal by utilizing the reconstructed strong interference signal, and obtain the signal whose interference have been cancelled.

Here, after the receiver performs the interference cancellation for the received signal by utilizing the reconstructed strong interference signal and obtains the signal whose interference have been cancelled, the receiver may set a column that corresponds to a sequence number of the strong interference code channel in the system matrix into 0, obtain a clipped matrix, and perform equalization operation for the output signals of a plurality of code channels by utilizing the clipped matrix.

According to the present invention, the strong interference signal may be reconstructed by utilizing the system matrix, and the interference cancellation may be performed for the received signal by utilizing the reconstructed strong interference signal. Therefore, the complexity of the operation for the matrix inversion can be reduced and the performance of the apparatus can be improved by reducing the order of the matrix, and thus the efficiency of the process for cancelling the interference can be increased.

Figure 2:
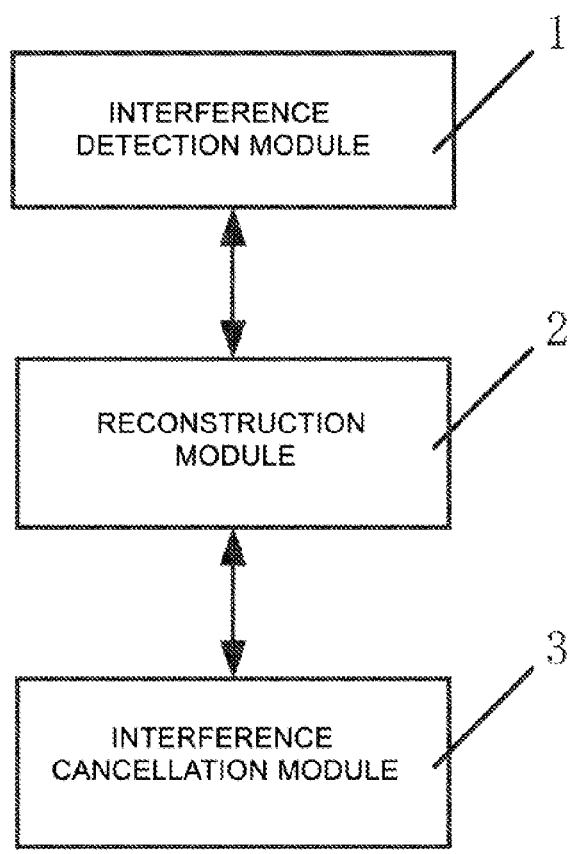
FIG. 2 is a structure block diagram illustrating an interference cancellation apparatus according to an embodiment of the present invention.

FIG. 2 is a structure block diagram illustrating an interference cancellation apparatus according to an embodiment of the present invention. The apparatus may be provided in the receiver, and as illustrated in FIG. 2, the apparatus may comprise:

an interference detection module 1, being configured for determining a strong interference code channel among all code channels that carry a received signal, and determining a signal that corresponds to the strong interference code channel to be a strong interference signal, wherein the received signal is a signal that have been matched filtered;

a reconstruction module 2, being configured for obtaining the reconstructed strong interference signal based on the determined strong interference signal reconstructed from a system matrix; and an interference cancellation module 3, being configured for performing the interference cancellation for the received signal by utilizing the reconstructed strong interference signal, and obtaining the signal whose interference have been cancelled.

In addition, the apparatus may further comprise:

an interference code channel determining module (not shown), being configured for determining a power value of each code channel, comparing the power value with a power value of a code channel of a local user, and determining the code channel to be a strong interference code channel if a ratio of the power value and the power value of the code channel of the local user is larger than or equal to a predetermined value;

a matrix clipping module (not shown), being configured for setting a column that corresponds to the sequence number of the strong interference code channel in the system matrix into 0 and obtaining a clipped matrix;

an equalization processing module (not shown), being configured for performing an equalization operation for the signals whose interference have been cancelled by utilizing the clipped matrix.

Figure 3:
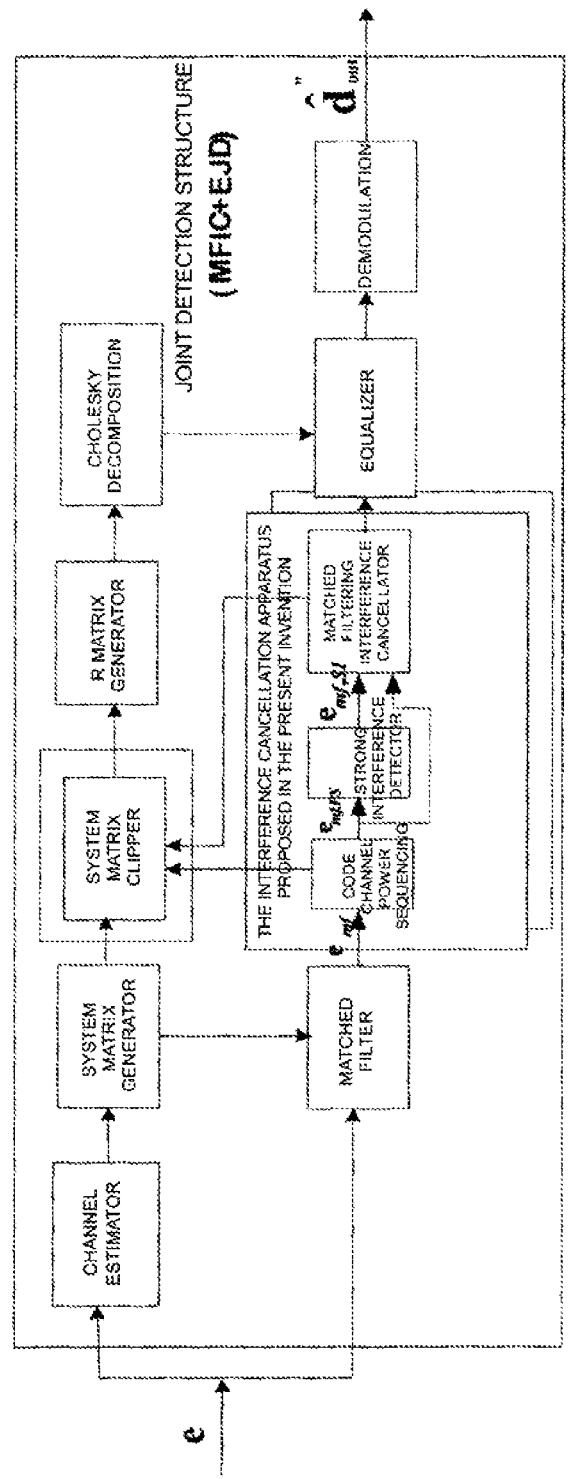
FIG. 3 is a diagram illustrating a position where the interference cancellation apparatus locates in a joint detection system according to an embodiment of the present invention.
Figure 4:
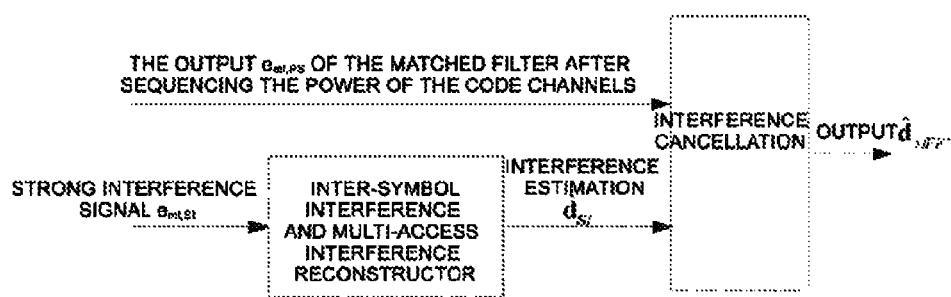
FIG. 4 is a diagram illustrating the interference cancellation apparatus according to the present invention.

FIG. 3 is a diagram illustrating the position where the interference cancellation apparatus locates in a joint detection system according to an embodiment of the present invention. As illustrated in FIG. 3, the joint system may comprise: a channel estimator, a system matrix generating module, a R matrix generator, a Cholesky decomposition, a matched filter, a demodulation, an equalizer, a code channel power sequencer, a strong interference detector, a matched filtering interference canceller, and a system matrix clipper. Here, the functions of the channel estimator, the system matrix generating module, the R matrix generator, the Cholesky decomposition, and the matched filter are known in the related art, while the code channel power sequencer, the strong interference detector and the matched filtering interference canceller are added and the functions of the system matrix clipper and the equalizer are upgraded according to the present invention. FIG. 4 is a diagram illustrating the interference cancellation apparatus according to the present invention. In the following, according to the present invention, the method for performing the interference cancellation will be described in details regarding the apparatus as illustrated in FIGS. 3 and 4, which may comprise the following steps:

Step 1: the powers of all code channels may be sequenced by utilizing the output $e_{mf}$ of the matched filter and the strong interference signal $e_{mf,SI}$ may be detected. Specifically, the mode for detecting the strong interference signal $e_{mf,SI}$ may be as follows:

Supposed that the output of the matched filter is $e_{mf}$, then the power value of the code channel k may be:

$$P^{(k)} = \sum_{i=1}^{44} |e_{mf,i}^{(k)}|^2$$

Here, $e_{mf,i}^{(k)}$ is the i-th symbol of the k-th code channel for the output of the matched filter, wherein 44 is the number of symbols of each code channel.

The code channels of $e_{mf}$ according to the power values of the code channels may be re-sequenced in an ascending sequence and $e_{mf,PS}$ may be generated. Specifically, if the power value ratio of the k-th code channel $P^{(k)}$ and the code channel of the local user $P^{(LocalUser)}$ is larger than a predetermined threshold, then it is determined that the k-th code channel is the strong interference signal. In other words, if $P^{(k)}/P^{(LocalUser)} > \theta$, then it is determined that the k-th code channel is the strong interference signal. It may be supposed that the number of strong interference code channels is n, then the signal composed by the strong interference signals extracted from the output signals of the matched filter after the re-sequenced of the power values of the code channels may be:

$$e_{mf,SI} = \left\{ \underbrace{\overbrace{0 \ldots 0}^{K_{vru}} \overbrace{0 \ldots 0}^{K_{vru}}}_{44*(K_{vru}-n)} \ldots e_{mf,1}^{(SI1)} \ldots e_{mf,44}^{(SI1)} \ldots e_{mf,1}^{(SIn)} \ldots e_{mf,44}^{(SIn)} \right\}$$

Here, Kvru indicates the total number of the code channels, and $e_{mf,j}^{(SIi)}$ indicates the j-th element in the code channel of the i-th strong interference signal.

Step 2: the reconstructed interference signal $e_{mf,j}^{(SIi)}$ may be obtained by utilizing the system matrix and the strong interference signal $e_{mf,SI}$. Specifically, the mode for the reconstruction may be as follows:

Supposed that the strong interference signal is $e_{mf,SI}$, then the reconstructed interference signal $\hat{d}_{SI}$ may be:

$$\hat{d}_{SI} = \overline{\text{diag}}(A^H A) e_{mf,SI}$$

Here, A is the system matrix, and $\overline{\text{diag}}(.)$ is the matrix generated by setting the diagonal elements into 0.

$$A = \begin{bmatrix} b_1^{(1)} & \ldots & b_1^{(Kvru)} & \ldots & 0 & 0 \\ \vdots & \ldots & \vdots & \ldots & \vdots & \vdots \\ b_{Q+W-1}^{(1)} & \ldots & b_{Q+W-1}^{(Kvru)} & \ldots & 0 & 0 \\ 0 & \ldots & 0 & \ddots & b_1^{(Kvru-1)} & b_1^{(Kvru)} \\ \vdots & \ldots & \vdots & \ldots & \vdots & \vdots \\ 0 & \ldots & 0 & 0 & b_{Q+W-1}^{(Kvru-1)} & b_{Q+W-1}^{(Kvru)} \end{bmatrix}_{(NQ+W-1)*KN}$$

$$A^H A = R = \begin{bmatrix} R_0 & R_1 & 0 & \ldots & 0 & 0 \\ R_1^H & R_0 & R_1 & \ldots & 0 & 0 \\ 0 & R_1^H & R_0 & \ldots & 0 & 0 \\ \vdots & \vdots & \vdots & \ddots & \vdots & \vdots \\ 0 & \ldots & 0 & R_1^H & R_0 & R_1 \\ 0 & 0 & \ldots & 0 & R_1^H & R_0 \end{bmatrix}$$

Thus, $$\hat{d}_{SI} = \overline{\text{diag}} \begin{bmatrix} R_0 & R_1 & 0 & \ldots & 0 & 0 \\ R_1^H & R_0 & R_1 & \ldots & 0 & 0 \\ 0 & R_1^H & R_0 & \ldots & 0 & 0 \\ \vdots & \vdots & \vdots & \ddots & \vdots & \vdots \\ 0 & \ldots & 0 & R_1^H & R_0 & R_1 \\ 0 & 0 & \ldots & 0 & R_1^H & R_0 \end{bmatrix} \cdot \begin{pmatrix} 0 \\ \vdots \\ 0 \\ e_{mf,1}^{(SI1)} \\ \vdots \\ e_{mf,44}^{(SIn)} \end{pmatrix}$$

Here, each of R0 and R1 is a Kvru×Kvru order matrix.

Step 3: the interference cancellation for the output $e_{mf}$ of the matched filter may be performed by utilizing $\hat{d}_{SI}$ and the signal $\hat{d}_{MFIC}$ whose interference have been cancelled may be obtained. Then the signal $\hat{d}_{MFIC}$ may be transferred to the equalizer in the joint detection. Specifically, the interference cancellation method may be as follows:

If the output of the matched filter after re-sequencing the power values of the code channels is $e_{mf,PS}$, then $\hat{d}_{MFIC} = (\text{diag}(A^H A))^{-1} \,_{mf,PS} - (\text{diag}(A^H A))^{-1} \hat{d}_{SI}$ or $\hat{d}_{MFIC} = (\text{diag}(A^H A))^{-1} (e_{mf,PS} - \hat{d}_{SI})$ Here, $(.)^{-1}$ is the matrix inversion, and diag(.) is the matrix generated by setting the non-diagonal elements into 0.

In the above method and apparatus, supposing $R'_{0i,i} = 1/R_{0i,j}$, then $\hat{d}_{MFIC}(i) = R'_{0(i \% 16, i \% 16)} \times e_{mf,PS}(i) - R'_{0(i \% 16, i \% 16)} \times \hat{d}_{SI}(i)$ or $\hat{d}_{MFIC}(i) = R'_{0(i \% 16, i \% 16)} \times (e_{mf,PS}(i) - \hat{d}_{SI}(i))$ Here, % represents a mode operation.

Step 4: the cancelled interference code channel information may be transferred to the system matrix clipper, the system matrix information that corresponds to the code channel whose interference have been cancelled may be deleted by the system matrix clipper, and the result may be inputted into the subsequent module. Specifically, the method for obtaining the clipped matrix may be as follows:

The sequence numbers {SI1, . . . SIn} that correspond to $\hat{d}_{MFIC}$ that may be corresponding to the sequence numbers in the system matrix A are {k+1, . . . , Kvru}, which may be inputted into the system matrix clipping module. The system matrix clipping module may clip the rows and columns of the original system matrix A and obtain the clipped matrix.

$$A' = \begin{bmatrix} b_1^{(1)} & \cdots & b_1^{(k)} & \cdots & 0 & 0 \\ \vdots & \cdots & \vdots & \cdots & \vdots & \vdots \\ b_{Q+W-1}^{(1)} & \cdots & b_{Q+W-1}^{(k)} & \cdots & 0 & 0 \\ 0 & \cdots & 0 & \ddots & b_1^{(k-1)} & b_1^{(k)} \\ \vdots & \cdots & \vdots & \cdots & \vdots & \vdots \\ 0 & \cdots & 0 & 0 & b_{Q+W-1}^{(k-1)} & b_{Q+W-1}^{(k)} \end{bmatrix}_{(NQ+W-1) * KN}$$

The final joint detecting result may be obtained by performing joint detection by utilizing the output of the matched filter of the result for deleting $\hat{d}_{MFIC}$ that corresponds to the clipped matrix.

If the matrix clipping is not performed for the system matrix, the joint detection may be performed for the signal whose interference have been cancelled by utilizing the system matrix, and the final joint detection result may be obtained.

Here, step 4 is optional, and the aim thereof may lie in further reducing the complexity of the joint detection algorithm.

The method and apparatus according to the present invention may be provided in the communication system, for example, TD-SCDMA system, DS-CDMA system. In the following, the present invention will be described in connection with specific embodiments. Table 1 shows the specific implementation parameters.

TABLE 1

| Communication system | TD-SCDMA |
| Number of cells | 1 |
| Midamble number | 1 |
| Modulation mode | QPSK |

TABLE 1-continued

| Number of transmitting antennas | 1 |
| Number of receiving antennas | 1 |
| Number of code channels | 16 |
| Code channel number | 1~16 |
| Number of time slots | 1 |

Firstly, the powers of all code channels may be sequenced by utilizing the output $e_{mf}$ of the matched filter and the strong interference signal $e_{mf,SI}$ may be detected. Specifically, the mode for detecting the strong interference signal $e_{mf,SI}$ may be as follows:

Supposed that the output of the matched filter is $e_{mf}$, then the power values of the k-th code channel may be:

$$P^{(k)} = \sum_{i=1}^{44} |e_{mf,i}^{(k)}|^2, k = 1, 2, \ldots, 16$$

Here, $e_{mf,i}^{(k)}$ is the i-th symbol of the k-th code channel for the output of the matched filter.

The code channels of $e_{mf}$ according to the power values of the code channels may be re-sequenced in an ascending sequence and $e_{mf,PS}$ may be generated. Specifically, if a ratio of the power value of the k-th code channel $P^{(k)}$ and the code channel of the local user $P^{(LocalUser)}$ is larger than a certain threshold $\theta$, it is determined that the k-th code channel is the strong interference signal. In other words, if $P^{(k)}/P^{(LocalUser)} > \theta$, it is determined that the k-th code channel is the strong interference signal. It may be supposed that the number of strong interference code channels is n, then the signal composed by the strong interference signal extracted from the output signal of the matched filter after the re-sequencing of the powers of the code channels may be:

$$e_{mf,SI} = \frac{\left\{ \overbrace{\underbrace{0 \ldots 0}_{K_{vru}} \underbrace{0 \ldots 0}_{K_{vru}}}^{44*(Kvru-n)} \ldots e_{mf,1}^{(SI1)} \ldots e_{mf,44}^{(SI1)} \ldots e_{mf,1}^{(SIn)} \ldots e_{mf,44}^{(SIn)} \right\}}{704}$$

Here, Kvru=16 indicates the total number of the code channels, and $e_{mf,j}^{(SIi)}$ indicates the j-th element in the code channel of the i-th strong interference signal.

Then, the reconstructed strong interference signal $\hat{d}_{SI}$ may be obtained by utilizing the system matrix and the strong interference signal $e_{mf,SI}$. Specifically, the mode for the reconstruction may be as follows:

Supposed that the strong interference signal is $e_{mf,SI}$, then the reconstructed strong interference signal $\hat{d}_{SI}$ may be:

$\hat{d}_{SI} = \overline{\text{diag}}(A^H A) e_{mf,SI}$

Here, A is the system matrix, and $\overline{\text{diag}}(.)$ is the matrix generated by setting the diagonal elements into 0.

$$A^H A = R = \underbrace{\begin{bmatrix} R_0 & R_1 & 0 & \cdots & 0 & 0 \\ R_1^H & R_0 & R_1 & \cdots & 0 & 0 \\ 0 & R_1^H & R_0 & \cdots & 0 & 0 \\ \vdots & \vdots & \vdots & \ddots & \vdots & \vdots \\ 0 & \cdots & 0 & R_1^H & R_0 & R_1 \\ 0 & 0 & \cdots & 0 & R_1^H & R_0 \end{bmatrix}}_{704}$$

$$\hat{d}_{SI} = \overline{\text{diag}}\begin{bmatrix} R_0 & R_1 & 0 & \cdots & 0 & 0 \\ R_1^H & R_0 & R_1 & \cdots & 0 & 0 \\ 0 & R_1^H & R_0 & \cdots & 0 & 0 \\ \vdots & \vdots & \vdots & \ddots & \vdots & \vdots \\ 0 & \cdots & 0 & R_1^H & R_0 & R_1 \\ 0 & 0 & \cdots & 0 & R_1^H & R_0 \end{bmatrix} \cdot \begin{pmatrix} 0 \\ \vdots \\ 0 \\ e_{mf,1}^{(SI1)} \\ \vdots \\ e_{mf,44}^{(SIn)} \end{pmatrix}$$

Here, each of R0 and R1 is a Kvru×Kvru order matrix.

Then, the interference cancellation for the output $e_{mf}$ of the matched filter may be performed by utilizing $\hat{d}_{SI}$ and the signal $\hat{d}_{MFIC}$ whose interference have been cancelled may be obtained. Then the signal $\hat{d}_{MFIC}$ may be transferred to the equalizer in the joint detection. Specifically, the interference cancellation method may be as follows:

If the output of the matched filter after re-sequencing the powers of the code channels is $e_{mf,PS}$, then the process method for the interference cancellation may be as follows:

$$\hat{d}_{MFIC} = (\text{diag}(A^H A))^{-1} e_{mf,PS} - (\text{diag}(A^H A))^{-1} \hat{d}_{SI}$$

or $$\hat{d}_{MFIC} = (\text{diag}(A^H A))^{-1} (e_{mf,PS} - \hat{d}_{SI})$$

Here, $(.)^{-1}$ is the matrix inversion, and diag(.) is the matrix generated by setting the non-diagonal elements into 0.

In the above method and apparatus, supposed that $R'_{O_{i,i}} = 1/R_{O_{i,i}}$, then $$\hat{d}_{MFIC}(i) = R'_{O(i \% 16, i \% 16)} \times e_{mf,PS}(i) - R'_{O(i \% 16, i \% 16)} \times \hat{d}_{SI}(i),$$

i=1, 2, . . . , 704 or $$\hat{d}_{MFIC}(i) = R'_{O(i \% 16, i \% 16)} \times (e_{mf,PS}(i) - \hat{d}_{SI}(i)),$$

i=1, 2, . . . , 704

Wherein, % represents a mode operation.

In the end, the cancelled interference code channel information may be transferred to the system matrix clipper, the system matrix information that corresponds to the code channel whose interference have been cancelled may be deleted by the system matrix clipper, and the result may be inputted into the subsequent module. Specifically, the method for obtaining the clipped matrix may be as follows:

The {k+1, . . . , Kvru} corresponding to the sequence numbers {SI1, . . . SIn} that correspond to $\hat{d}_{MFIC}$ may be inputted into the system matrix clipping module, which may clip the rows and columns of the original system matrix A, $$A' = \begin{bmatrix} b_1^{(1)} & \cdots & b_1^{(k)} & \cdots & 0 & 0 \\ \vdots & \cdots & \vdots & \cdots & \vdots & \vdots \\ b_{Q+W-1}^{(1)} & \cdots & b_{Q+W-1}^{(k)} & \cdots & 0 & 0 \\ 0 & \cdots & 0 & \ddots & b_1^{(k-1)} & b_1^{(k)} \\ \vdots & \cdots & \vdots & \cdots & \vdots & \vdots \\ 0 & \cdots & 0 & 0 & b_{Q+W-1}^{(k-1)} & b_{Q+W-1}^{(k)} \end{bmatrix}_{(NQ+W-1) \ast KN}$$

According to the present invention, the interference cancellation method is a kind of improved linear multi-user detection method, which may advantageously suppress the impact on the useful signal caused by the strong interference signal without significantly increasing the complexity of the existing joint detection method, and improve the performance of the receiver. This method may eliminate the impact caused by the interference signal and improve the receiving performance of the useful signal with minor complexity of implementation and especially in the condition that the power of the interference signal is large.

The above description is only preferred embodiments of the present invention and the present invention is not limited thereto. Any modification, equivalent replacement, and improvement made under the spirit and principle of the present invention should fall into the protection scope of the present invention.

What is claimed is:

1. An interference cancellation method in a receiver, the method comprising:
   determining a strong interference code channel among all code channels that carry a received signal, and determining a signal that corresponds to the strong interference code channel to be a strong interference signal by a receiver, wherein the received signal is a signal that has been matched filtered;
   obtaining a reconstructed strong interference signal based on the determined strong interference signal using a system matrix; and
   performing the interference cancellation for the received signal by utilizing the reconstructed strong interference signal, to obtain the received signal without interference,
   wherein the reconstructed strong interference signal is determined by the following equation:

$$\hat{d}_{SI} = \overline{\text{diag}}(A^H A) e_{mf,SI}$$

wherein $e_{mf,SI}$ is the strong interference signal, A is the system matrix, $\overline{\text{diag}}(.)$ is a matrix generated by setting diagonal elements into 0,
   wherein, $$e_{mf,SI} = \left\{ \underbrace{0 \ \cdots \ 0}_{K_{vru}} \ \overbrace{\underbrace{0 \ \cdots \ 0}_{K_{vru}}}^{44 \ast (K_{vru}-n)} \ \cdots \ e_{mf,1}^{(SI1)} \ \cdots \ e_{mf,44}^{(SI1)} \ \cdots \ e_{mf,1}^{(SIn)} \ \cdots \ e_{mf,44}^{(SIn)} \right\},$$

Kvru being the total number of the code channels, $e_{mf,i}^{(SI1)}$ being the j-th element in the code channel of the i-th strong interference signal, and n beinq the number of the strong interference code channels.

2. The interference cancellation method according to claim 1, wherein after performing the interference cancellation to obtain the received signal without the interference, the method further comprises:

setting a column that corresponds to a sequence number of the strong interference code channel in the system matrix into 0 to obtain a clipped matrix;

performing an equalization operation for the received signal without the interference using the clipped matrix by the receiver.

3. The interference cancellation method according to claim 1, wherein the determining of the strong interference code channel comprises:

determining a first power value of each code channel, comparing the first power value with a second power value of a code channel of a local user, and determining the code channel to be the strong interference code channel if a ratio of the first power value and the second power value is larger than or equal to a predetermined value.

4. The interference cancellation method according to claim 3, wherein the power value $P^{(k)}$ of the k-th code channel is determined by the following equation:

$$P^{(k)} = \sum_{i=1}^{X} |e_{mf,i}^{(k)}|^2$$

wherein $e_{mf,i}^{(k)}$ is the i-th symbol of the k-th code channel for the received signal output by a matched filter, and X is the number of symbols of each code channel.

5. The interference cancellation method according to claim 1, wherein the received signal without the interference is determined by the following equation:

$$\hat{d}_{MFIC} = (\text{diag}(A^H A))^{-1} e_{mf,PS} - (\text{diag}(A^H A))^{-1} \hat{d}_{SI}$$

wherein, $(.)^{-1}$ is the matrix inversion, diag(.) is a matrix generated by setting non-diagonal elements into 0, $e_{mf,SI}$ is the strong interference signal, and $e_{mf,PS}$ is a signal generated by sequencing the powers of all code channels in an ascending sequence.

6. An interference cancellation apparatus, comprising:

an interference detection module, being configured for determining a strong interference code channel among all code channels that carry a received signal, and determining a signal that corresponds to the strong interference code channel to be a strong interference signal, wherein the received signal is a signal that has been matched filtered;

a reconstruction module, being configured for obtaining a reconstructed strong interference signal based on the determined strong interference signal using a system matrix; and an interference cancellation module, being configured for performing the interference cancellation for the received signal by utilizing the reconstructed strong interference signal, to obtain the received signal without interference, wherein the reconstructed strong interference signal is determined by the following equation:

$$\hat{d}_{SI} = \overline{\text{diag}}(A^H A) e_{mf,SI}$$

wherein $e_{mf,SI}$ is the strong interference signal, A is the system matrix, $\overline{\text{diag}}(.)$ is a matrix generated by setting diagonal elements into 0, wherein, $$e_{mf,SI} = \left\{ \underbrace{\overline{0 \ldots 0}}_{K_{vru}} \underbrace{\overline{0 \ldots 0}}_{K_{vru}}^{44*(K_{vru}-n)} \ldots e_{mf,1}^{(SI1)} \ldots e_{mf,44}^{(SI1)} \ldots e_{mf,1}^{(SIn)} \ldots e_{mf,44}^{(SIn)} \right\},$$

Kvru being the total number of the code channels, $e_{mf,i}^{(SI1)}$ being the j-th element in the code channel of the i-th strong interference signal, and n being the number of the strong interference code channels.

7. The interference cancellation apparatus according to claim 6, wherein the apparatus further comprises:

an interference code channel determining module, being configured for determining a first power value of each code channel, comparing the first power value with a second power value of a code channel of a local user, and determining the code channel to be the strong interference code channel if a ratio of the first power value and the second power value is larger than or equal to a predetermined value.

8. The interference cancellation apparatus according to claim 6, wherein the apparatus further comprises:

a matrix clipping module, being configured for setting a column that corresponds to a sequence number of the strong interference code channel in the system matrix into 0 to obtain a clipped matrix.

9. The interference cancellation apparatus according to claim 8, wherein the apparatus further comprises:

an equalization processing module, being configured for performing an equalization operation for signals without interference on the strong interference code channel using the clipped matrix.

* * * * *